United States Patent
Xu et al.

(10) Patent No.: US 8,763,402 B2
(45) Date of Patent: Jul. 1, 2014

(54) MULTI-LOBED COOLING HOLE AND METHOD OF MANUFACTURE

(75) Inventors: JinQuan Xu, Groton, CT (US); Mark F. Zelesky, Bolton, CT (US); Atul Kohli, Tolland, CT (US); Matthew S. Gleiner, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/544,090

(22) Filed: Jul. 9, 2012

(65) Prior Publication Data

US 2013/0205790 A1 Aug. 15, 2013

Related U.S. Application Data

(60) Provisional application No. 61/599,372, filed on Feb. 15, 2012.

(51) Int. Cl.
 *F02C 1/00* (2006.01)
(52) U.S. Cl.
 USPC ............................................. 60/752
(58) Field of Classification Search
 USPC .................... 60/752–760, 806; 415/115, 116; 416/96 R, 97 R
 See application file for complete search history.

(56) References Cited

U.S. PATENT DOCUMENTS

| | | | |
|---|---|---|---|
| 4,197,443 A | 4/1980 | Sidenstick | |
| 4,529,358 A | 7/1985 | Papell | |
| 4,622,821 A | 11/1986 | Madden | |
| 4,653,279 A | 3/1987 | Reynolds | |
| 4,653,983 A | 3/1987 | Vehr | |
| 4,672,727 A | 6/1987 | Field | |
| 4,684,323 A | 8/1987 | Field | |
| 4,700,544 A | 10/1987 | Fucci | |
| 4,738,588 A | 4/1988 | Field | |
| 5,062,768 A | 11/1991 | Marriage | |
| 5,096,379 A | 3/1992 | Stroud et al. | |
| 5,129,231 A | 7/1992 | Becker et al. | |
| 5,252,026 A | 10/1993 | Shepherd | |
| 5,326,224 A | 7/1994 | Lee et al. | |
| 5,358,374 A | 10/1994 | Correia et al. | |
| 5,382,133 A | 1/1995 | Moore et al. | |
| 5,418,345 A | 5/1995 | Adamski | |

(Continued)

FOREIGN PATENT DOCUMENTS

| | | |
|---|---|---|
| EP | 1326007 A2 | 7/2003 |
| EP | 1609949 A1 | 12/2005 |
| EP | 1947296 A2 | 7/2008 |

OTHER PUBLICATIONS

The International Search Report mailed May 15, 2013 for International Application No. PCT/US2013/025697.

(Continued)

*Primary Examiner* — Phutthiwat Wongwian
(74) *Attorney, Agent, or Firm* — Kinney & Lange, P.A.

(57) ABSTRACT

A gas turbine engine component includes a cooling hole. The cooling hole includes an inlet, an outlet, a metering section and a diffusing section. The diffusing section extends from the metering section to the outlet and includes a first lobe diverging longitudinally and laterally from the metering section, a second lobe adjacent the first lobe and diverging longitudinally and laterally from the metering section, and a transition region having a portion that extends between the first and second lobes and an end adjacent the outlet.

22 Claims, 11 Drawing Sheets

(56) References Cited

U.S. PATENT DOCUMENTS

| | | |
|---|---|---|
| 5,419,681 A | 5/1995 | Lee |
| 5,609,779 A | 3/1997 | Crow et al. |
| 5,651,662 A | 7/1997 | Lee et al. |
| 5,660,525 A | 8/1997 | Lee et al. |
| 5,683,600 A | 11/1997 | Kelley et al. |
| 5,813,836 A | 9/1998 | Starkweather |
| 6,139,258 A | 10/2000 | Lang, III et al. |
| 6,183,199 B1 | 2/2001 | Beeck et al. |
| 6,241,468 B1 | 6/2001 | Lock et al. |
| 6,243,948 B1 | 6/2001 | Lee et al. |
| 6,287,075 B1 | 9/2001 | Kercher |
| 6,307,175 B1 | 10/2001 | Blochlinger et al. |
| 6,494,678 B1 | 12/2002 | Bunker |
| 6,547,524 B2 | 4/2003 | Kohli et al. |
| 6,572,335 B2 | 6/2003 | Kuwabara et al. |
| 6,744,010 B1 | 6/2004 | Pepe et al. |
| 6,944,580 B1 | 9/2005 | Blume et al. |
| 6,973,419 B1 | 12/2005 | Fortin et al. |
| 6,979,176 B2 | 12/2005 | Nakamata et al. |
| 7,186,085 B2 | 3/2007 | Lee |
| 7,273,351 B2 | 9/2007 | Kopmels |
| 7,328,580 B2 | 2/2008 | Lee et al. |
| 7,374,401 B2 | 5/2008 | Lee |
| 7,578,653 B2 | 8/2009 | Klasing et al. |
| 7,726,131 B2 | 6/2010 | Sze et al. |
| 7,766,609 B1 | 8/2010 | Liang |
| 7,887,294 B1 | 2/2011 | Liang |
| 7,997,868 B1 | 8/2011 | Liang |
| 8,038,399 B1 | 10/2011 | Liang |
| 8,057,181 B1 | 11/2011 | Liang |
| 8,066,484 B1 | 11/2011 | Liang |
| 8,245,519 B1 * | 8/2012 | Liang .............................. 60/806 |
| 2001/0036401 A1 | 11/2001 | Harvey et al. |
| 2002/0159888 A1 | 10/2002 | Rinck et al. |
| 2005/0106020 A1 | 5/2005 | Bunker et al. |
| 2008/0003096 A1 | 1/2008 | Kohli et al. |
| 2008/0145208 A1 | 6/2008 | Klasing et al. |
| 2008/0286090 A1 * | 11/2008 | Okita .............................. 415/115 |
| 2009/0013695 A1 | 1/2009 | Dierberger et al. |
| 2009/0304499 A1 | 12/2009 | Strock et al. |
| 2010/0068032 A1 | 3/2010 | Liang |
| 2010/0282721 A1 | 11/2010 | Bunker et al. |
| 2011/0097191 A1 | 4/2011 | Bunker |
| 2011/0185572 A1 | 8/2011 | Wei et al. |
| 2011/0293423 A1 | 12/2011 | Bunker et al. |
| 2012/0051941 A1 | 3/2012 | Bunker |
| 2012/0167389 A1 | 7/2012 | Lacy et al. |
| 2013/0045106 A1 * | 2/2013 | Lacy .............................. 416/237 |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

* cited by examiner

MULTI-LOBED COOLING HOLE AND METHOD OF MANUFACTURE

CROSS-REFERENCE TO RELATED APPLICATION

This application claims priority to U.S. Provisional Application No. 61/599,372, filed on Feb. 15, 2012 and entitled "MULTI-LOBED COOLING HOLE AND METHOD OF MANUFACTURE", the disclosure of which is incorporated by reference in its entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

A gas turbine engine component includes a cooling hole. The cooling hole includes an inlet, an outlet, a metering section and a diffusing section. The diffusing section extends from the metering section to the outlet and includes a first lobe diverging longitudinally and laterally from the metering section, a second lobe adjacent the first lobe and diverging longitudinally and laterally from the metering section, and a transition region having a portion that extends between the first and second lobes and an end adjacent the outlet.

A gas turbine engine wall includes inner and outer surfaces, an inlet located at the inner surface, an outlet located at the outer surface, a metering section and a diffusing section. The diffusing section is located between the metering section and the outlet and includes a first lobe diverging longitudinally and laterally from the metering section, a second lobe adjacent the first lobe and diverging longitudinally and laterally from the metering section, and a transition region having at least a portion located between the first and second lobes.

DETAILED DESCRIPTION

Figure 1:
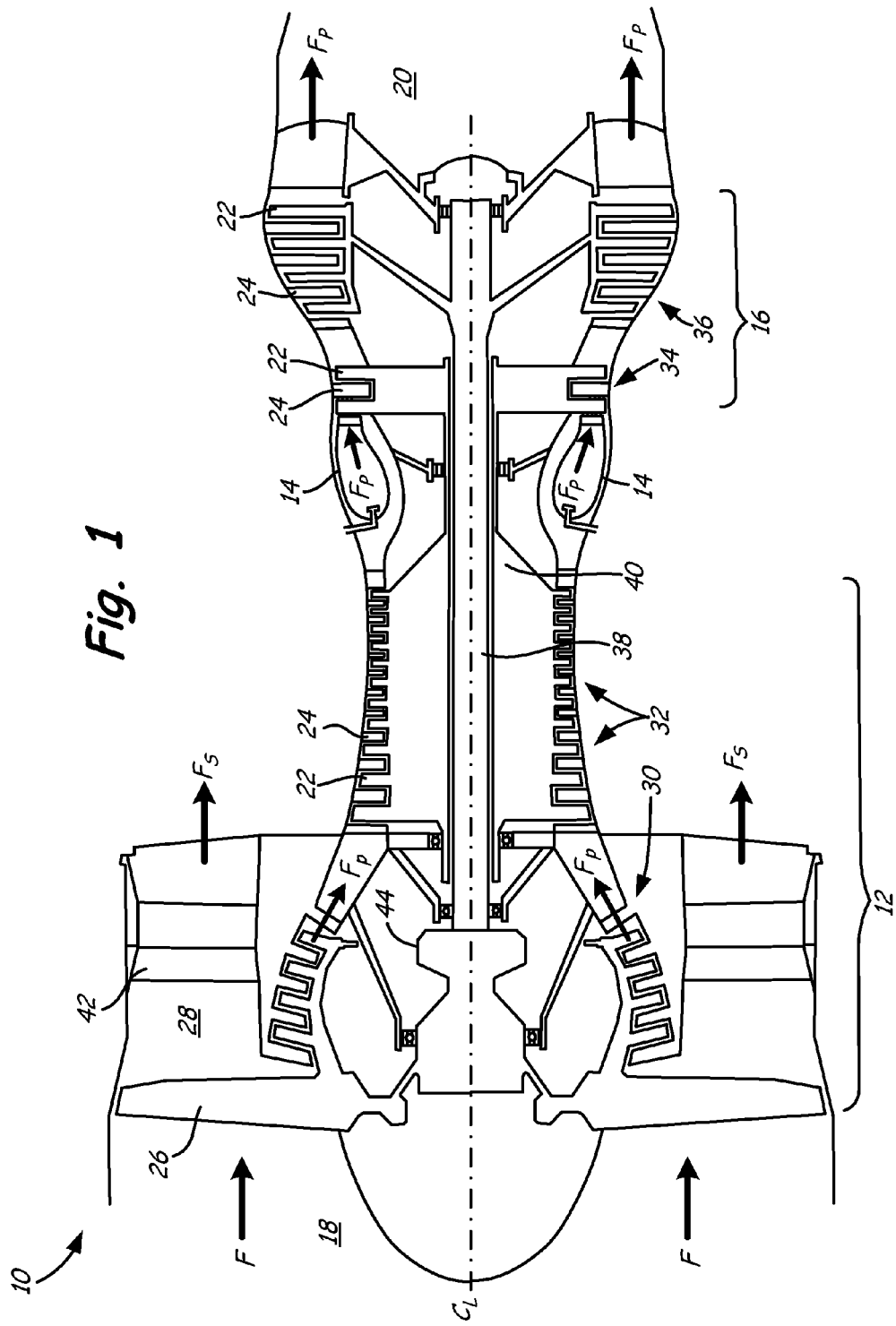
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
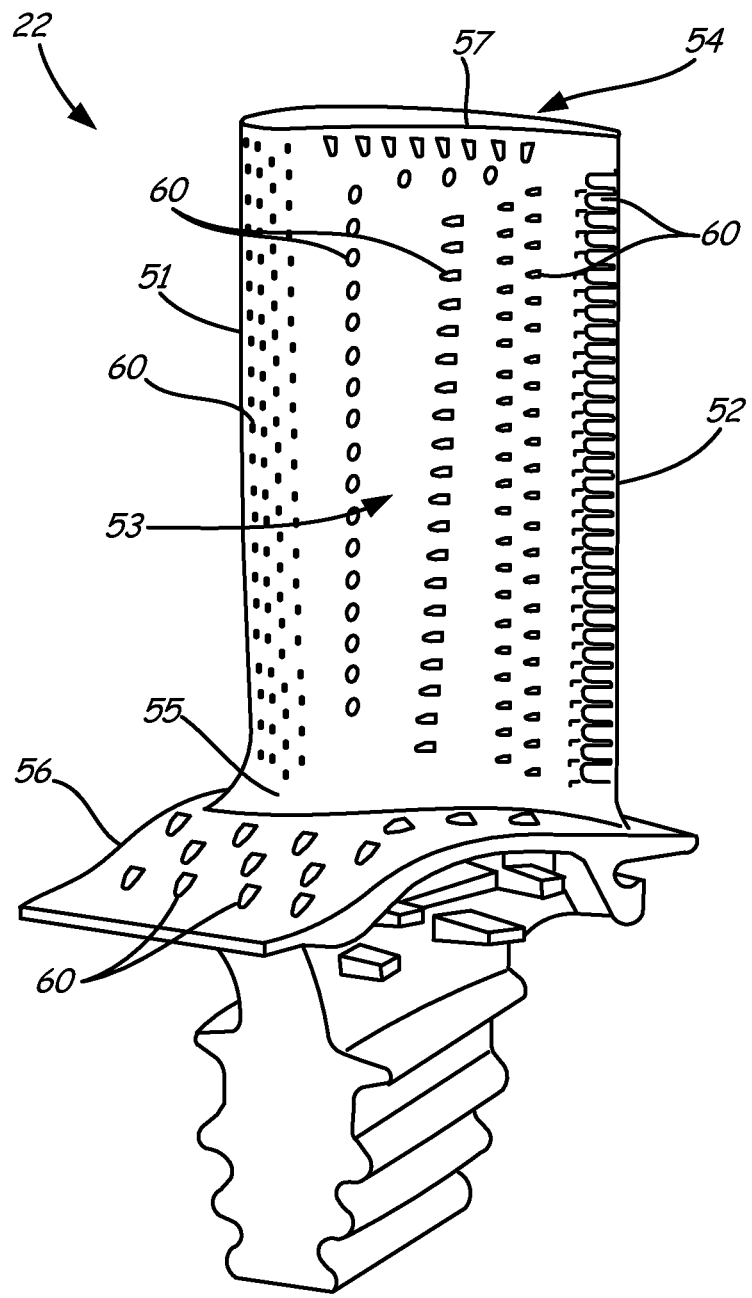
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
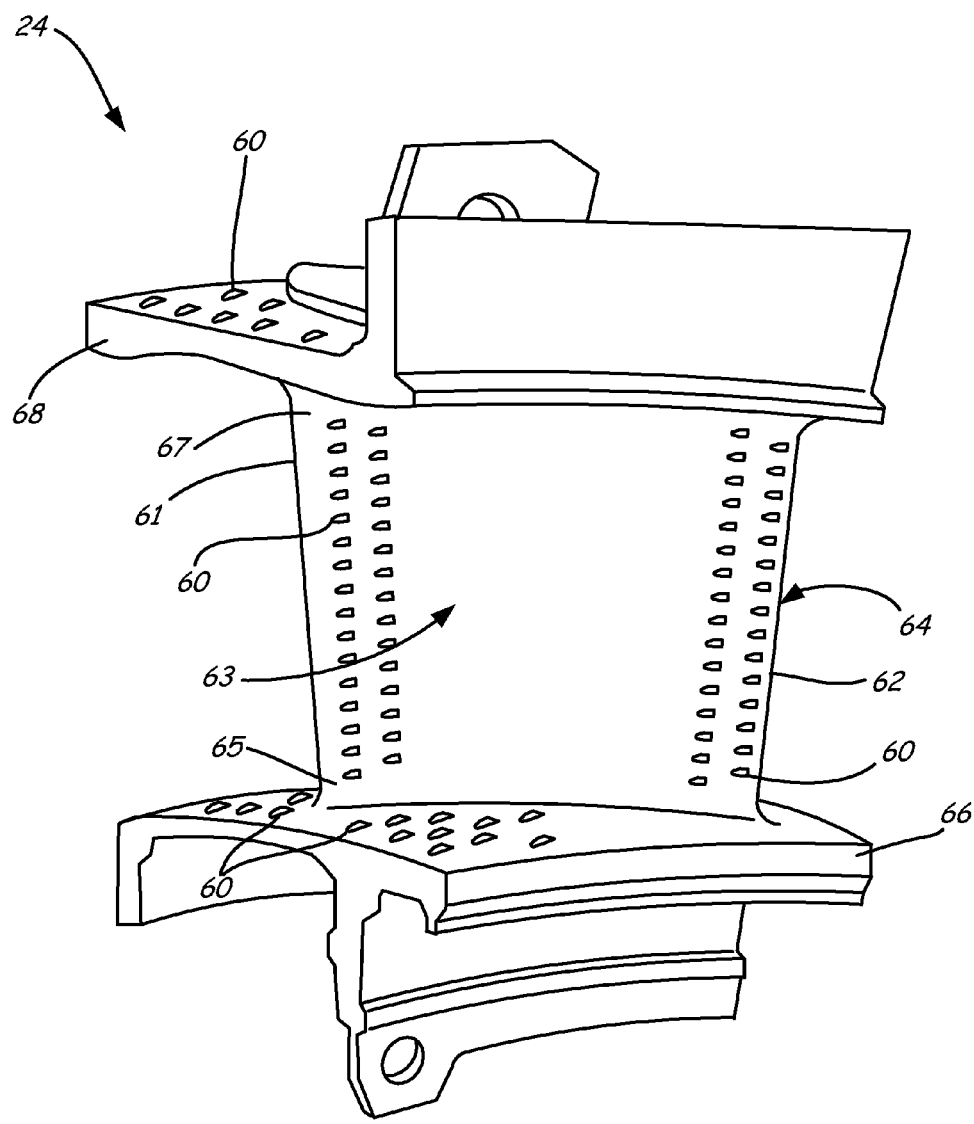
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While film cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot outer surfaces of airfoils 22 and 24, and other gas turbine engine components, so that less flow is needed for cooling and efficiency is maintained or increased.

The multi-lobed cooling holes described herein provide a cooling solution that offers improved film cooling coverage and eliminates or reduces the problems associated with conventional diffusion film cooling holes, such as flow separation and blow off. Additionally, multi-lobed cooling holes can be manufactured at a lower cost than other cooling holes having unique geometries. These features present a cooling hole that offers improvements over the state of the art. Multi-lobed cooling holes provide improved film effectiveness and reduce the likelihood of film separation so that they work as intended at high blowing ratios and reduce the detrimental effects such as kidney vortices.

Figure 3:
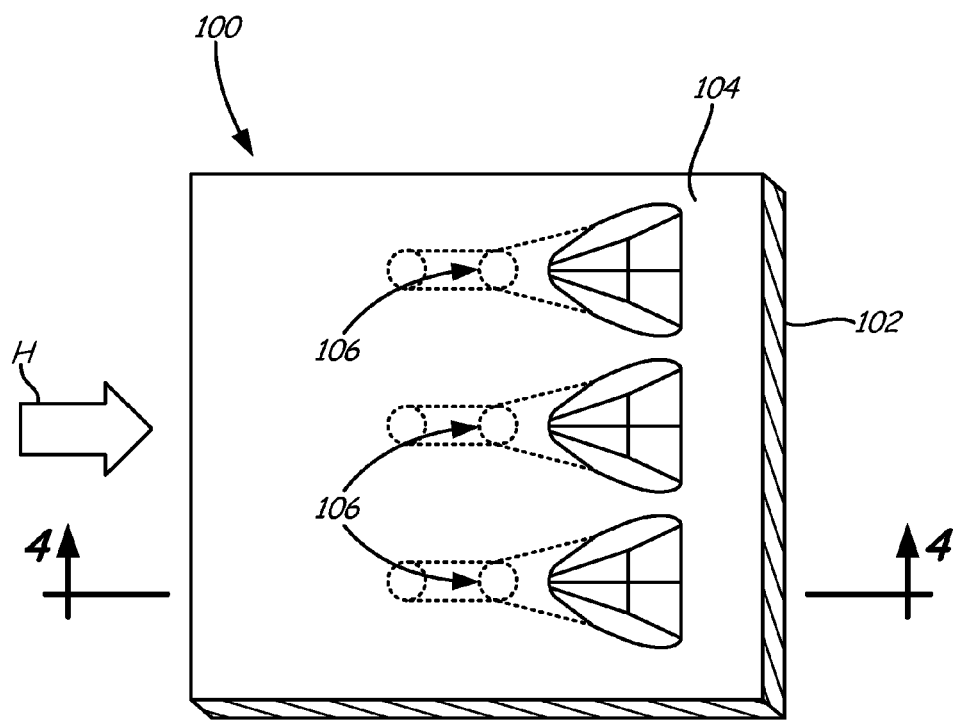
FIG. 3 illustrates a wall having multi-lobed cooling holes.

FIG. 3 illustrates a view of a wall having multi-lobed film cooling holes. Wall 100 includes inner wall surface 102 and outer wall surface 104. As described in greater detail below, wall 100 is metallic and outer wall surface 104 can include coating layers such as a thermal barrier coating or a bonding layer. Multi-lobed film cooling holes 106 are oriented so that their inlets are positioned on the first wall surface 102 and their outlets are positioned on outer wall surface 104. During gas turbine engine operation, outer wall surface 104 is in proximity to high temperature gases (e.g., combustion gases, hot air). Cooling air is delivered inside wall 100 where it exits the interior of the component through cooling holes 106 and forms a cooling film on outer wall surface 104. As shown in FIG. 3, cooling holes 106 have two lobes in the diffusing section of the cooling hole.

As described below in greater detail, cooling air flows out of cooling holes 106 and flows through each of the lobes in the diffusing section. Cooling holes 106 can be arranged in a linear row on wall 100 as shown in FIG. 3 and positioned axially so that the cooling air flows in substantially the same direction longitudinally as the high temperature gases flowing past wall 100. In this embodiment, cooling air passing through cooling holes 106 exits cooling holes traveling in substantially the same direction as the high temperature gases flowing along outer wall surface 104 (represented by arrow H). Here, the row of cooling holes 106 is substantially perpendicular to the direction of flow H. In alternate embodiments, the orientation of cooling holes 106 can be arranged on outer wall surface 104 so that the flow of cooling air is substantially perpendicular to the high temperature gas flow (i.e. cooling air exits cooling holes 106 radially) or at an angle between parallel and perpendicular. Cooling holes 106 can also be provided in a staggered formation or other formation on wall 100. Cooling holes 106 can be located on a variety of components that require cooling. Suitable components include, but are not limited to, turbine vanes and blades, combustors, blade outer air seals, and augmentors, etc. Cooling holes 106 can be located on the pressure side or suction side of vanes and blades. Cooling holes 106 can also be located on the blade tip or blade or vane platforms.

Figure 4:
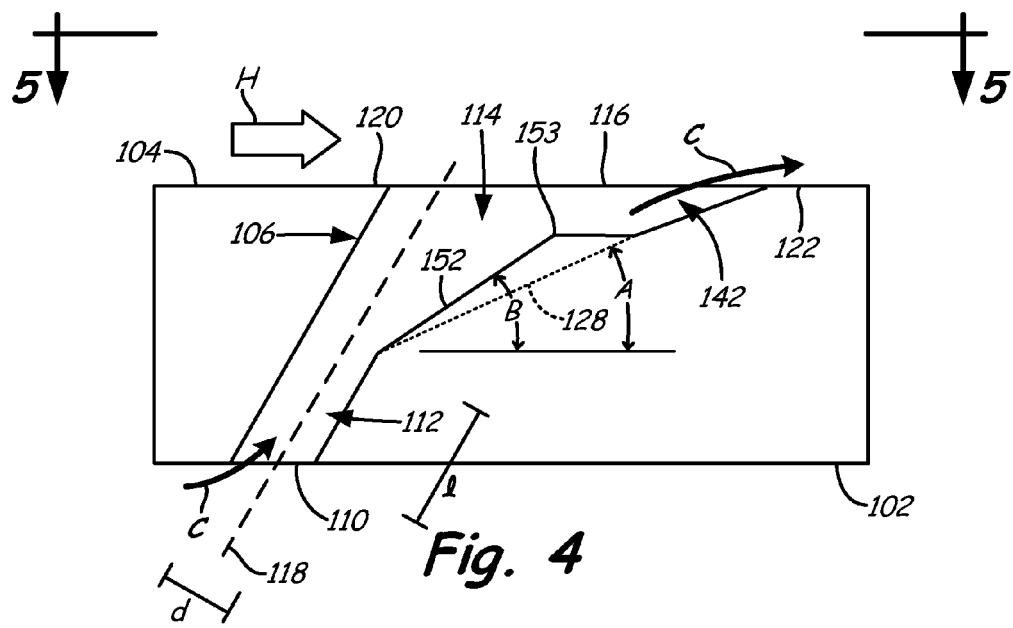
FIG. 4 is a sectional view through one embodiment of a multi-lobed cooling hole.
Figure 5:
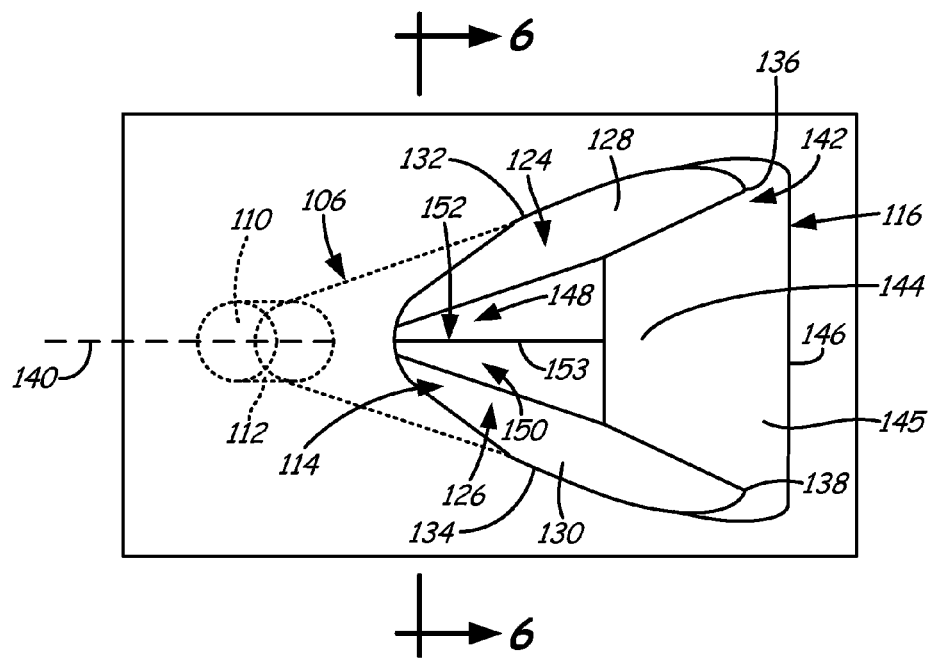
FIG. 5 is a view of the multi-lobed cooling hole illustrated in FIG. 4 and taken along the line 5-5.
Figure 6:
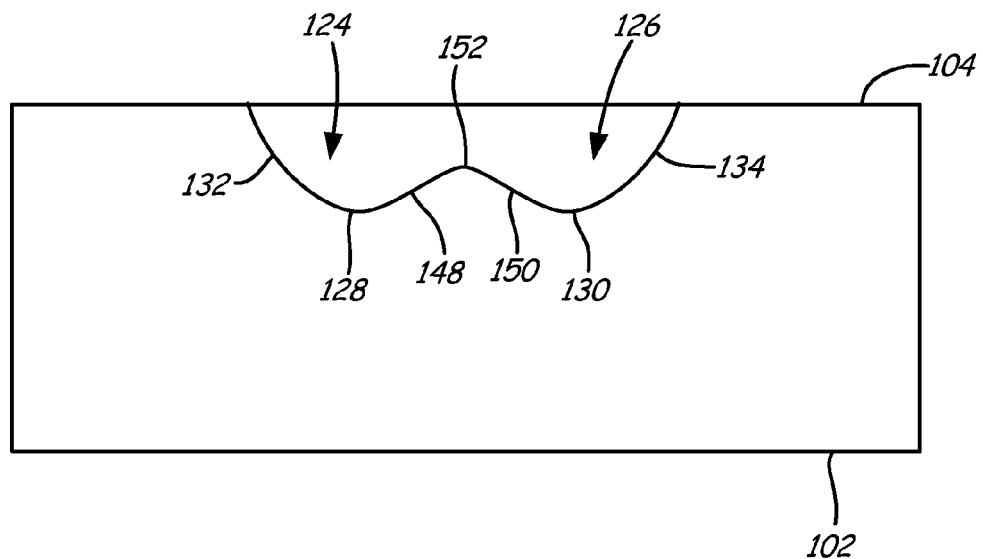
FIG. 6 is a sectional view through the multi-lobed cooling hole illustrated in FIG. 5 and taken along the line 6-6.

FIGS. 4, 5 and 6 illustrate one embodiment of cooling hole 106 in greater detail. FIG. 4 illustrates a sectional view of multi-lobed film cooling hole 106 of FIG. 3 taken along the line 4-4. Cooling hole 106 includes inlet 110, metering section 112, diffusing section 114 and outlet 116. Inlet 110 is an opening located on inner wall surface 102. Cooling air C enters cooling hole 106 through inlet 110 and passes through metering section 112 and diffusing section 114 before exiting cooling hole 106 at outlet 116 along outer wall surface 104.

Metering section 112 is adjacent to and downstream from inlet 110 and controls (meters) the flow of air through cooling hole 106. In exemplary embodiments, metering section 112 has a substantially constant flow area from inlet 110 to diffusing section 114. Metering section 112 can have circular, oblong (oval or elliptical), racetrack (oval with two parallel sides having straight portions) or crescent shaped cross sections. In FIGS. 4-6, metering section 112 has a circular cross section. Circular metering sections 112 have a length l and diameter d (hydraulic diameter $d_h$ where metering section 112 is non-circular). In exemplary embodiments, inlet 110 and metering section 112 have the same diameter d. In some embodiments, circular metering section 112 has a length l according to the relationship: $d \leq l \leq 3d$. That is, the length of metering section 112 is between one and three times its diameter. The length of metering section 112 can exceed 3d, reaching upwards of 30d. In alternate embodiments, metering section 112 has an oblong or racetrack-shaped cross section. As oblong and racetrack configurations are not circular, their metering sections 112 have a length l and hydraulic diameter $d_h$. In some embodiments, metering section 112 has a length/according to the relationship: $d_h \le l \le 3d_h$. That is, the length of metering section 112 is between one and three times its hydraulic diameter. Again, the length of metering section 112 can exceed $3d_h$, reaching upwards of $30d_h$. In exemplary embodiments, metering section 112 is inclined with respect to wall 100 as illustrated in FIG. 4 (i.e. metering section 112 is not perpendicular to wall 100). Metering section 112 has a longitudinal axis represented by numeral 118. Longitudinal axis 118 represents the angle of metering section 112 between first wall surface 102 and second wall surface 104.

Diffusing section 114 is adjacent to and downstream from metering section 112. Cooling air C diffuses within diffusing section 114 before exiting cooling hole 106 along outer wall surface 104. Outer wall surface 104 includes upstream end 120 (upstream of cooling hole 106) and downstream end 122 (downstream from cooling hole 106). Diffusing section 114 opens along outer wall surface 104 between upstream end 120 and downstream end 122. As shown in FIG. 4, cooling air C diffuses in diffusing section 114 as it flows towards outlet 116.

As shown best in FIG. 5, diffusing section 114 includes two channel-like lobes 124 and 126. Each lobe 124, 126 diverges longitudinally and laterally from metering section 112 and has a bottom surface (bottom surfaces 128 and 130, respectively), a side wall along the outer edge of diffusing section 114 (the side walls are represented by lines 132 and 134, respectively) and a trailing edge (trailing edges 136 and 138, respectively). FIG. 4 best illustrates the longitudinal divergence (from longitudinal axis 118), while FIG. 5 best illustrates the lateral divergence (from centerline axis 140, an axis extending through the center of metering section 112). As shown in FIG. 5, first lobe 124 laterally diverges upwards from centerline axis 140 and second lobe 126 laterally diverges downwards from centerline axis 140. Cooling air C leaving metering section 112 and entering diffusing section 114 diffuses into lobes 124 and 126, causing the cooling air to spread laterally within diffusing section 114. Side wall 132 and bottom surface 128 direct cooling air C through first lobe 124, and side wall 134 and bottom surface 130 direct cooling air C through second lobe 126. As shown best in FIG. 4, bottom surface 130 can be inclined with respect to outer wall surface 104 as shown by inclination angle A.

Diffusing section 114 also includes interlobe or transition region 142. Portion 144 of transition region 142 is located between first lobe 124 and second lobe 126. In some embodiments, a portion of transition region 142 extends beyond lobes 124 and 126 and that portion is no longer "between" the lobes. End 146 of transition region 142 is adjacent outlet 116 where the outlet meets outer wall surface 104. Portion 144, located between first lobe 124 and second lobe 126, can extend towards metering section 112 to varying degrees. In the embodiment shown in FIG. 5, portion 144 is present only near the respective trailing edges 136 and 138 of lobes 124 and 126. The location of end 146 of transition region 142 relative to trailing edges 136 and 138 can also vary. In the embodiment shown in FIG. 5, end 146 is spaced from trailing edges 136 and 138. In this embodiment, trailing edges 136 and 138 and hence, first lobe 124 and second lobe 126, do not extend to outlet 116 or outer wall surface 104. Portion 145 of transition region 142 is located between trailing edges 136 and 138 and outlet 116. In some exemplary embodiments, transition region 142 spans trailing edge 136 and trailing edge 138 as shown in FIG. 5.

Figure 5A:
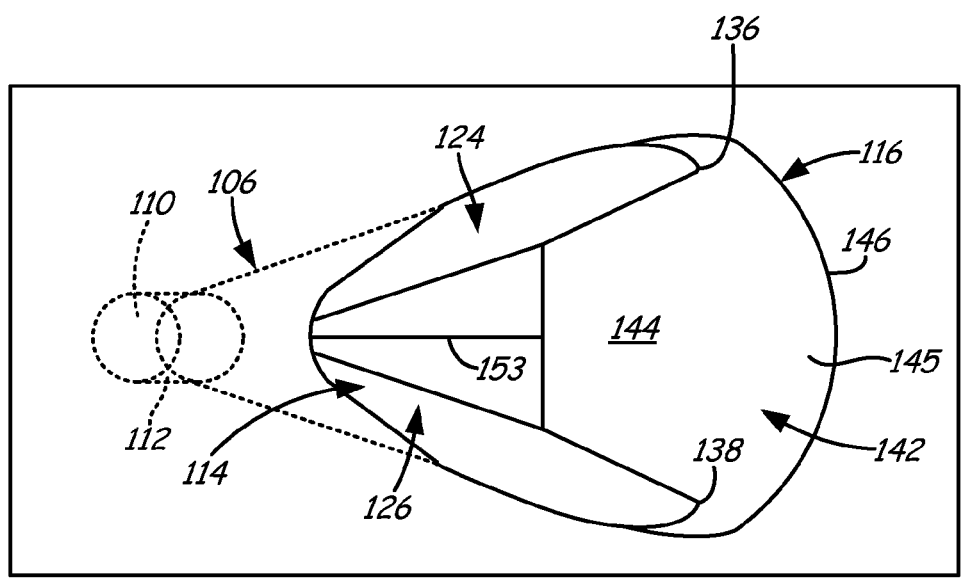
FIG. 5A is a view of another embodiment of a multi-lobed cooling hole.

Transition region 142 (and portions 144 and 145) can take various shapes and have different configurations depending on the location and desired flow profile of cooling hole 106. The bottom surface of transition region 142 can be flat or curved. For example, transition region 142 can be longitudinally convex, laterally convex, both longitudinally and laterally convex, concave or have other shapes. A curved (for example, longitudinally convex) bottom surface of transition region 142 can facilitate improved flow attachment due to the Coanda effect. End 146 can also be curved, instead of straight, as shown in FIG. 5A.

In the embodiment illustrated in FIG. 5, diffusing section 114 also includes first inclined portion 148 and second inclined portion 150. First inclined portion 148 is located adjacent to and extends from bottom surface 128 of first lobe 124. First inclined portion 148 extends from first lobe 124 towards centerline axis 140 and second lobe 126. Second inclined portion 150 is located adjacent to and extends from bottom surface 130 of second lobe 126. Second inclined portion 150 extends from second lobe 126 towards centerline axis 140 and first lobe 124. Depending on the location of cooling hole 106, first inclined portion 148 and second inclined portion 150 can have varying lateral and longitudinal lengths and extend from lobes 124 and 126 at various angles (inclinations). Like the side walls and bottom surfaces, first and second inclined portions 148 and 150 direct cooling air C through lobes 124 and 126 of diffusing section 114. First and second inclined portions 148 and 150 can be planar or curved.

In some embodiments, first inclined portion 148 and second inclined portion 150 meet together to form a ridge as shown in FIG. 5. Ridge 152 is located between first lobe 124 and second lobe 126 at the intersection of first inclined portion 148 and second inclined portion 150. Ridge 152 aids in separating and directing the flow of cooling air C into first lobe 124 and second lobe 126. The location and angle of ridge 152 within diffusing section 114 can vary to direct cooling air C within diffusing section 114 to suit the location and desired flow profile of cooling hole 106. As shown in FIG. 5, ridge 152 is coincident with centerline axis 140 (i.e. centerline axis 140 lies atop ridge 152). Alternatively, the location of ridge 152 can be shifted towards side wall 132 or side wall 134 instead of following centerline axis 140. Corresponding changes to the lateral lengths and/or angles of first inclined portion 148 and second inclined portion 150 must accompany any change in the location of ridge 152. Ridge 152 can also be inclined relative to centerline axis 140 instead of being parallel. Ridge 152 can be angled so that a downstream portion of ridge 152 is closer to one side wall than the other. As with positional changes of ridge 152, corresponding changes to the lateral lengths and/or angles of first inclined portion 148 and second inclined portion 150 must accompany any change in the angle of ridge 152.

Ridge 152 can extend longitudinally to varying degrees between metering section 112 and transition region 142. Ridge 152 can extend upstream all the way to metering section 112, beginning where metering section 112 and diffusing section 114 meet as shown in FIG. 4. Alternatively, ridge 152 can begin farther downstream (closer to outlet 116). Ridge 152 can extend downstream to transition region 142 as shown in FIG. 4. Alternatively, ridge 152 can converge with bottom surfaces 128 and 130 upstream of transition region 142. Corresponding changes to the longitudinal lengths of first inclined portion 148 and second inclined portion 150 must accompany any change in the longitudinal extension of ridge 152. As shown best in FIG. 4, ridge 152 can be inclined with respect to outer wall surface 104 as shown by inclination angle B. Also, as shown in FIG. 4, ridge 152 does not extend to outlet 116. At point 153, ridge 152 begins to converge towards bottom surfaces 128 and 130 so that no ridge is present in transition region 142. FIG. 6 illustrates a lateral cross-section view of the embodiment of cooling hole 106 shown in FIGS. 4 and 5. The height of ridge 152 with respect to bottom surfaces 128 and 130 can vary. Ridge 152 can also be rounded to a greater a degree than shown in FIG. 6.

Adding transition region 142 to diffusing section 114 improves the thermo-mechanical fatigue tolerance of multi-lobed film cooling hole 106. Without transition region 142, the trailing edge of cooling hole 106 (where outlet 116 and outer wall surface 104 meet) would include sharp edges or corners at the trailing edge of ridge 152 and at trailing edges 136 and 138 of lobes 124 and 126. These sharp edges and corners are highly susceptible to thermo-mechanical fatigue. Over time, cracks develop in these areas due to the temperature cycling that occurs during operation. These cracks further reduce cooling effectiveness and performance and will eventually lead to failure, requiring repair or replacement of the affected component. Repairing and replacing components is costly both in terms of materials and in aircraft downtime. By incorporating transition region 142 to diffusing section 114, the previously sharp edges and corners are blended into smoother transitions that are less susceptible to thermo-mechanical fatigue. Additionally, the smoother transitions near ridge 152 and trailing edges 136 and 138 reduces the likelihood that cooling air C will "jet off" instead of forming a cooling film along outer wall surface 104.

Figure 7:
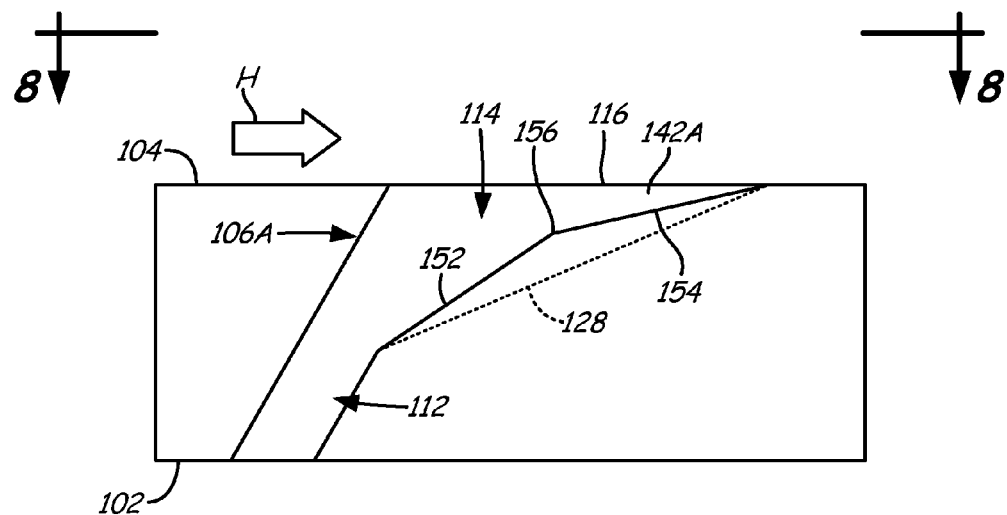
FIG. 7 is a sectional view through another embodiment of a multi-lobed cooling hole.
Figure 8:
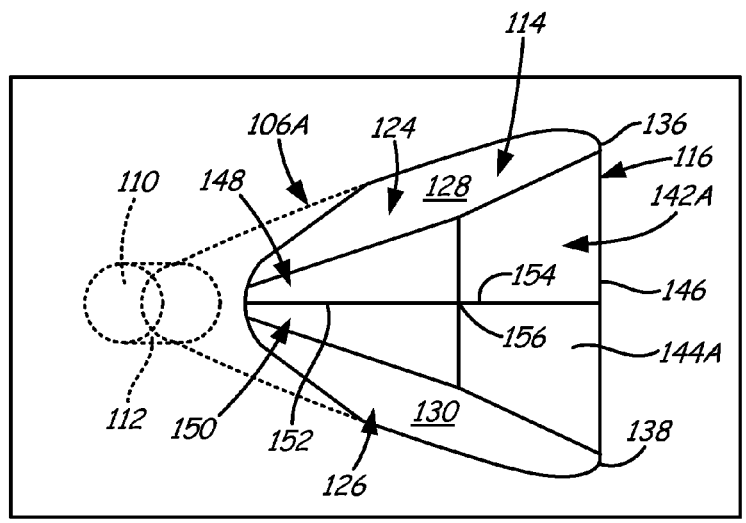
FIG. 8 is a view of the multi-lobed cooling hole illustrated in FIG. 7 and taken along the line 8-8.

In some exemplary embodiments, transition region 142 has a generally trapezoidal shape. FIGS. 7 and 8 illustrate another embodiment of a multi-lobed film cooling hole in greater detail. FIG. 7 illustrates a sectional view of cooling hole 106A, while FIG. 8 illustrates a plane view. In cooling hole 106A, first lobe 124 and second lobe 126 extend to outlet 116 at outer wall surface 104. Transition region 142A includes only first portion 144A as no portion of transition region 142A extends between respective trailing edges 136 and 138 of lobes 124 and 126 and outlet 116. Transition region 142A has a trapezoidal shape and extends towards metering section 112 farther than the embodiment shown in FIGS. 4-6. Transition region 142A has a compound trapezoidal shape as ridge 154 separates transition region 142A into two sides, each having a separate surface. Each surface of transition region 142A can be flat or curved. Curved surfaces can be convex longitudinally, laterally or both longitudinally and laterally. In alternate embodiments, ridge 154 is absent from transition region 142A and transition region 142A is a flat trapezoidal surface extending between first lobe 124 and second lobe 126. Diffusing section 114 includes first inclined portion 148, second inclined portion 150 and ridge 152. In this embodiment, transition region 142A includes ridge 154 laterally bisecting transition region 142A. Ridge 154 longitudinally aligns with bottom surface 130 of second lobe 126 at outlet 116 at outer wall surface 104 as shown in FIG. 7. The intersection of ridges 152 and 154 at the point where transition region 142A meets first inclined portion 148 and second inclined portion 150 forms apex 156. By forming apex 156 upstream of outlet 116, diffusing section 114 facilitates improved flow attachment due to the Coanda effect. The location and shape of transition region 142A can vary so that the location of apex 156 varies between metering section 112 and outlet 116.

Figure 9:
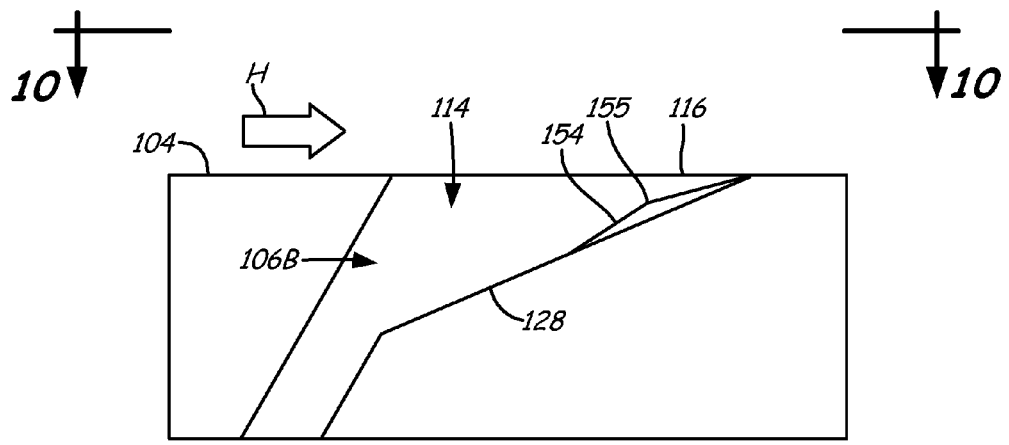
FIG. 9 is a sectional view through another embodiment of a multi-lobed cooling hole.
Figure 10:
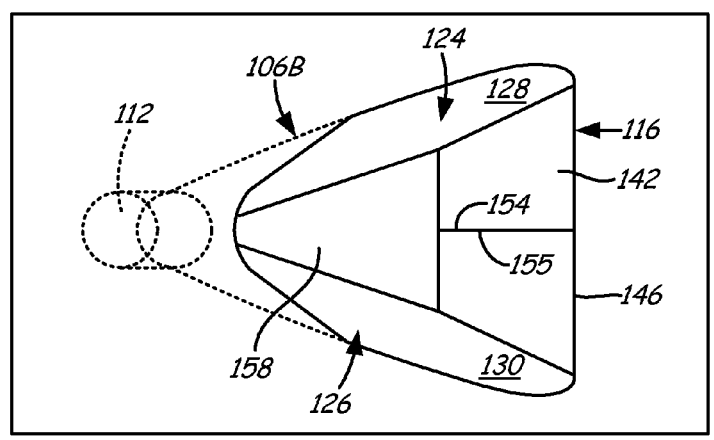
FIG. 10 is a view of the multi-lobed cooling hole illustrated in FIG. 9 and taken along the line 10-10.

FIGS. 9 and 10 illustrate another embodiment of a multi-lobed film cooling hole in greater detail. FIG. 9 illustrates a sectional view of cooling hole 106B, while FIG. 10 illustrates a plane view. In cooling hole 106B, no ridge separates first lobe 124 and second lobe 126 upstream of transition region 142. Instead, central portion 158 is located between lobes 124 and 126. Central portion 158 can be flush with bottom surfaces 128 and 130 of lobes 124 and 126, respectively. Alternatively, central portion 158 can be a raised surface (flat or curved) between first lobe 124 and second lobe 126. Central portion 158 can be flat or curved (convex or concave) in the longitudinal or lateral direction. Central portion 158 extends from metering section 112 to transition region 142. Transition region 142 can include ridge 154 (as shown in FIGS. 9 and 10) or ridge 154 can be omitted. Transition regions 142 having ridge 154 can also include apex 155 such that the trailing edge of ridge 154 longitudinally aligns with bottom surfaces 128 and 130 at outlet 116. The location and shape of transition region 142 can vary so that the location of apex 155 varies between central portion 158 and outlet 116.

The shape and curvature of central portion 158 can vary. Central portion 158 increases the geometric coverage of cooling air C within diffusing section 114, thereby increasing the film effectiveness of cooling air C flowing out of outlet 116. Whether central portion 158 is flat or curved can depend upon the local velocity of cooling air C and the blowing ratio of cooling hole 106. For example, at blowing ratios above about 2, central portion 158 can be small and provide a small degree of diffusion. At lower blowing ratios (less than about 0.5), central portion can be larger and allow for a greater degree of diffusion.

Figure 11A:
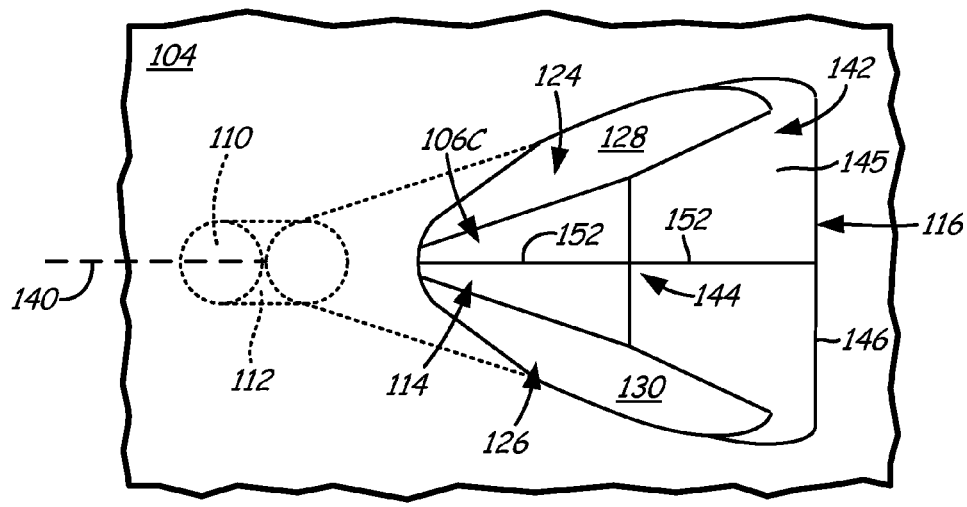
FIG. 11A is a view of another embodiment of a multi-lobed cooling hole.

As shown in FIG. 5, cooling hole 106 does not contain ridges or ribs in portion 145 of transition region 142. In alternative embodiments, portion 145 of transition region 142 includes one or more ridges or ribs. FIG. 11A illustrates one embodiment of a multi-lobed film cooling hole in which portion 145 of transition region 142 includes a ridge. FIG. 11A illustrates a plane view of cooling hole 106C. Cooling hole 106C is similar to cooling hole 106 illustrated in FIG. 5. However, ridge 152 extends from diffusing section 114 through transition region 142. Ridge 152 extends substantially along centerline axis 140 through portions 144 and 145 of transition region 142, all the way to end 146. In alternative embodiments, ridge 152 does not extend all the way to end 146, but transitions (tapers) towards the bottom surface of transition region 142 in portion 144 or 145. Ridge 152 in transition region 142 can also increase or decrease in relative height as it proceeds downstream through transition region 142. Ridge 162 can be longitudinally and/or laterally straight or curved.

Figure 11B:
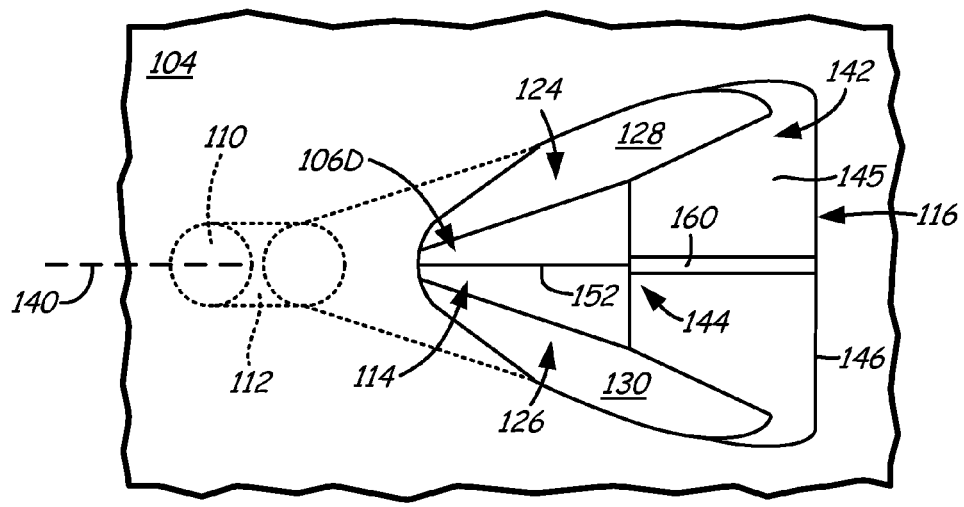
FIG. 11B is a view of another embodiment of a multi-lobed cooling hole.

In other embodiments, ridge 152 does not extend into transition region 142. Instead, rib 160 is formed in transition region 142 as shown in cooling hole 106D of FIG. 11B. In some embodiments, rib 160 is parallel to and aligned with ridge 152. In other embodiments, multiple ribs 160 are present in transition region 142. Extending ridge 152 into transition region 142 or adding rib 160 to transition region 142 helps to channel the flow of cooling air C and prevent it from separating downstream of lobes 124 and 126, reducing the likelihood of flow separation.

In addition to the features already described, bottom surfaces 128 and 130, side walls 132 and 134, inclined portions 148 and 150 and transition region 142 (including portions 144 and 145) can also contain anti-vortex features to prevent the formation of kidney vortices and subsequent hot gas entrainment at outlet 116.

The gas turbine engine components, gas path walls and cooling passages described herein can thus be manufactured using one or more of a variety of different processes. These techniques provide each cooling hole and cooling passage with its own particular configuration and features, including, but not limited to, inlet, metering, transition, diffusion, outlet, upstream wall, downstream wall, lateral wall, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process. Depending on component type, cooling hole or passage location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole or cooling passage, for example, different EDM, laser machining and other machining techniques may be used for forming the outlet and diffusion features, and for forming the transition, metering and inlet features.

Figure 12A:
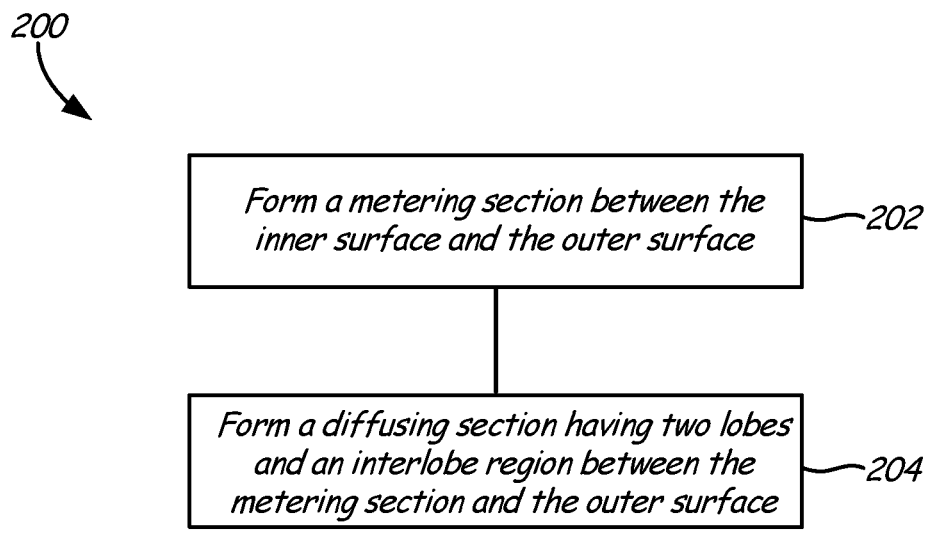
FIG. 12A is a simplified flow diagram illustrating one embodiment of a method for producing a cooling hole in a gas turbine engine wall.
Figure 12B:
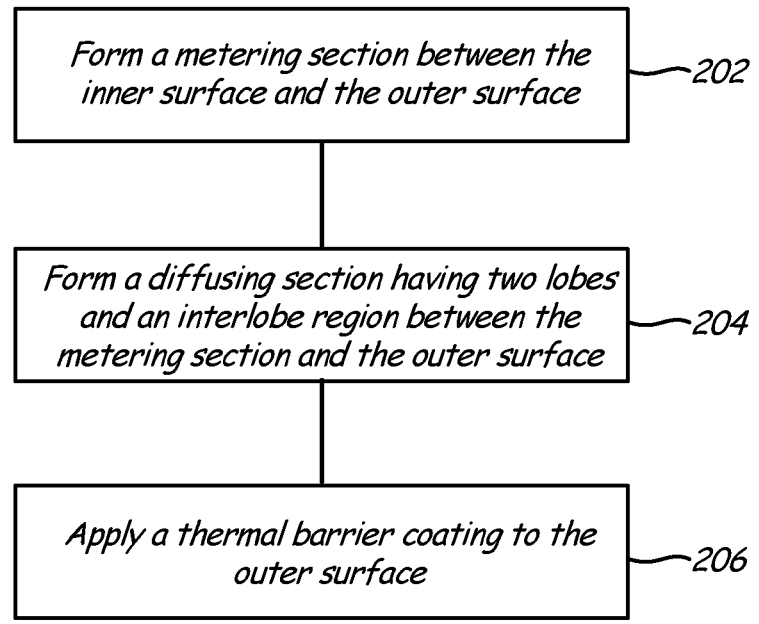
FIG. 12B is a simplified flow diagram illustrating another embodiment of a method for producing a cooling hole in a gas turbine engine wall.

FIG. 12A is a simplified flow diagram illustrating one embodiment of a method for producing a multi-lobed cooling hole in a gas turbine engine wall having inner and outer surfaces. Method 200 includes forming a metering section between the inner and outer surfaces (step 202) and forming a diffusing section between the metering section and the outer surface (step 204). Metering section 112 is formed in step 202 by one or more of the casting, machining or drilling techniques described above. The technique(s) chosen is/are typically determined based on performance, reproducibility and cost. In embodiments where step 202 occurs prior to step 204, inlet 110 and portions of diffusing section 114 and outlet 116 can also be formed during formation of metering section 112. Diffusing section 114 is formed in step 204 by one or more of the casting, machining or drilling techniques described above. As with metering section 112, the technique(s) chosen is/are typically determined based on performance, reproducibility and cost. In embodiments where step 202 occurs prior to step 204, outlet 116 is fully formed during step 204. Steps 202 and 204 can be performed before or after an optional thermal barrier coating application. In optional step 206 (shown as a step in method 200A in FIG. 12B), a thermal barrier coating is applied to outer wall surface 104. Application of the thermal barrier coating can also include the application of a bond coating prior to the thermal barrier coating. Steps 202, 204 and step 206 can be performed in any order depending on the location of cooling hole 106 and the location of diffusing section 114 relative to the metallic wall and the thermal barrier coating. As previously stated, the order of steps 202, 204 and step 206 can affect the machining or drilling techniques chosen for steps 202 and 204.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

Discussion of Possible Embodiments

The following are non-exclusive descriptions of possible embodiments of the present invention.

A gas turbine engine component can include a cooling hole. The cooling hole can include an inlet, an outlet, a metering section and a diffusing section. The diffusing section can extend from the metering section to the outlet and can include a first lobe diverging longitudinally and laterally from the metering section, a second lobe adjacent the first lobe and diverging longitudinally and laterally from the metering section, and an transition region having a portion that extends between the first and second lobes and an end adjacent the outlet.

The system of the preceding paragraph can optionally include, additionally and/or alternatively any, one or more of the following features, configurations and/or additional components:

the diffusing section can further include a first inclined portion adjacent the first lobe and extending towards the second lobe and a second inclined portion adjacent the second lobe and extending towards the first lobe;

the first inclined portion and the second inclined portion can meet to form a ridge between the first and second lobes;

the ridge can extend downstream into the transition region;

the ridge can extend downstream to the end of the transition region;

the first inclined portion, the second inclined portion and the portion of the transition region extending between the first and second lobes can meet to form an apex;

the transition region can have a second portion located between the outlet and the first and second inclined portions;

the diffusing section can further include a central portion extending between and adjacent to each of the first and second lobes;

the central portion can be flat;

the central portion can be curved;

the transition region can be generally trapezoidal;

the first lobe can include a first trailing edge, the second lobe can include a second trailing edge, and the transition region can span the first trailing edge and the second trailing edge;

the transition region can include a rib; and/or the transition region can include an upstream end, and the rib can extend from the upstream end of the transition region to the end of the transition region adjacent the outlet.

A gas turbine engine wall can include inner and outer surfaces, an inlet located at the inner surface, an outlet located at the outer surface, a metering section and a diffusing section. The diffusing section can be located between the metering section and the outlet and can include a first lobe diverging longitudinally and laterally from the metering section, a second lobe adjacent the first lobe and diverging longitudinally and laterally from the metering section, and an transition region having at least a portion located between the first and second lobes.

The system of the preceding paragraph can optionally include, additionally and/or alternatively any, one or more of the following features, configurations and/or additional components:

the diffusing section can further include a first inclined portion adjacent the first lobe and extending towards the second lobe and a second inclined portion adjacent the second lobe and extending towards the first lobe;

the first inclined portion and the second inclined portion can meet to form a ridge between the first and second lobes;

the ridge can extend downstream into the transition region;

the first inclined portion, the second inclined portion and the portion of the transition region located between the first and second lobes can meet to form an apex;

the transition region can have a second portion located between the outlet and the first and second inclined portions;

the diffusing section can further include a central portion extending between and adjacent to each of the first and second lobes; and/or the wall can belong to one of a blade, vane, blade platform, vane platform or combustor.

The invention claimed is:

1. A gas turbine engine component comprising:
 a wall having first and second opposing surfaces and defining a cooling hole, the cooling hole extending through the wall from an inlet located at the first wall surface to an outlet located at the second wall surface and having: a metering section; and
 a diffusing section extending from the metering section to the outlet, the diffusing section comprising: a first lobe diverging longitudinally and laterally from the metering section and having a trailing edge;
 a second lobe diverging longitudinally and laterally from the metering section and having a trailing edge; and
 a transition region having a portion that extends between the first and second lobes, the transition region comprising a downstream end adjacent the outlet, wherein the downstream end is at least axially coextensive with the trailing edges of the first and second lobes such that a substantially straight line is formed from the trailing edges of the first to second lobes.

2. The component of claim 1, wherein the diffusing section further comprises:
 a first inclined portion adjacent the first lobe and extending towards the second lobe; and
 a second inclined portion adjacent the second lobe and extending towards the first lobe.

3. The component of claim 2, wherein the first inclined portion and the second inclined portion meet to form a ridge between the first and second lobes.

4. The component of claim 3, wherein the ridge extends downstream into the transition region.

5. The component of claim 4, wherein the ridge extends downstream to the downstream end of the transition region.

6. The component of claim 3, wherein the first inclined portion, the second inclined portion and the portion of the transition region extending between the first and second lobes meet to form an apex.

7. The component of claim 2, wherein the transition region has a second portion located between the outlet and the first and second inclined portions.

8. The component of claim 1, wherein the diffusing section further comprises:
 a central portion extending between and adjacent to each of the first and second lobes.

9. The component of claim 8, wherein the central portion is flat.

10. The component of claim 8, wherein the central portion is curved.

11. The component of claim 1, wherein the transition region is generally trapezoidal.

12. The component of claim 1, wherein the transition region spans the trailing edge of the first lobe and the trailing edge of the second lobe.

13. The component of claim 1, wherein the transition region comprises a rib.

14. The component of claim 13, wherein the transition region comprises an upstream end, and wherein the rib extends from the upstream end of the transition region to the downstream end of the transition region adjacent the outlet.

15. A gas turbine engine wall comprising:
 generally opposed first and second surfaces;
 an inlet located at the first surface; an outlet located at the second surface; a metering section;
 a diffusing section located between the metering section and the outlet, the diffusing section comprising:
 a first lobe diverging longitudinally and laterally from the metering section and having a trailing edge;
 a second lobe diverging longitudinally and laterally from the metering section and having a trailing edge; and
 a transition region having a downstream end and at least a portion located between the first and second lobes, wherein the downstream end of the transition region is at least axially coextensive with the trailing edges of the first and second lobes such that a substantially straight line is formed from the trailing edges of the first to second lobes.

16. The wall of claim 15, wherein the diffusing section further comprises:
 a first inclined portion adjacent the first lobe and extending towards the second lobe; and
 a second inclined portion adjacent the second lobe and extending towards the first lobe.

17. The wall of claim 16, wherein the first inclined portion and the second inclined portion meet to form a ridge between the first and second lobes.

18. The wall of claim 17, wherein the ridge extends downstream into the transition region.

19. The wall of claim 18, wherein the first inclined portion, the second inclined portion and the portion of the transition region located between the first and second lobes meet to form an apex.

20. The wall of claim 16, wherein the transition region has a second portion located between the outlet and the first and second inclined portions.

21. The wall of claim 15, wherein the diffusing section further comprises:
   a central portion extending between and adjacent to each of the first and second lobes.

22. The wall of claim 15, wherein the wall belongs to one of a blade, vane, blade platform, vane platform or combustor.

* * * * *